(12) United States Patent
Lee et al.

(10) Patent No.: US 8,520,644 B2
(45) Date of Patent: Aug. 27, 2013

(54) METHOD FOR RE-DIRECTION OF UPLINK ACCESS

(75) Inventors: Young Dae Lee, Anyang-si (KR); Sung Duck Chun, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/312,183

(22) PCT Filed: Oct. 30, 2007

(86) PCT No.: PCT/KR2007/005386
§ 371 (c)(1),
(2), (4) Date: Apr. 29, 2009

(87) PCT Pub. No.: WO2008/054114
PCT Pub. Date: May 8, 2008

(65) Prior Publication Data
US 2010/0067498 A1    Mar. 18, 2010

Related U.S. Application Data

(60) Provisional application No. 60/863,545, filed on Oct. 30, 2006.

(30) Foreign Application Priority Data

Feb. 7, 2007 (KR) .................. 10-2007-0012576

(51) Int. Cl.
*H04J 3/00* (2006.01)
*H04M 11/00* (2006.01)
*H04W 72/00* (2009.01)
*H04W 4/00* (2009.01)
*H04K 1/10* (2006.01)

(52) U.S. Cl.
USPC ........... 370/336; 370/329; 370/331; 375/260; 455/403; 455/450

(58) Field of Classification Search
USPC ........................................... 370/336
See application file for complete search history.

(56) References Cited

U.S. PATENT DOCUMENTS 5,588,009 A   12/1996 Will
6,157,833 A   12/2000 Lawson-Jenkins et al.
(Continued)

FOREIGN PATENT DOCUMENTS

CN    1719932    1/2003
CN    1731887 A  2/2006
(Continued)

OTHER PUBLICATIONS

Sammour et al., U.S. Appl. No. 60/863,185.
(Continued)

*Primary Examiner* — Olumide T Ajibade Akonai
*Assistant Examiner* — Natasha Cosme
(74) *Attorney, Agent, or Firm* — McKenna Long & Aldridge LLP

(57) ABSTRACT

A method for prompt re-direction of uplink access of a specific user equipment is disclosed. For initial random access to a network, if a user equipment transmits a preamble, which includes information related to random access, to a network node, the network node sends grant/rejection information of the preamble and re-direction information as a response message to the preamble. In comparison with the related art which controls a rush of an access request of the user equipment through a second response message from the network node, since the rush of an access request is controlled by a first response message in the present invention, it is possible to promptly deal with abnormal communication status, thereby improving communication efficiency.

15 Claims, 4 Drawing Sheets

(56) References Cited

U.S. PATENT DOCUMENTS

| | | | |
|---|---|---|---|
| 6,233,430 | B1 | 5/2001 | Helferich |
| 6,324,171 | B1 | 11/2001 | Lee et al. |
| 6,353,628 | B1 | 3/2002 | Wallace et al. |
| 6,526,027 | B1 | 2/2003 | Yeom |
| 6,725,267 | B1 | 4/2004 | Hoang |
| 6,785,256 | B2 | 8/2004 | O'Neill |
| 7,197,317 | B2 | 3/2007 | Parkvall et al. |
| 7,443,813 | B2 | 10/2008 | Hwang et al. |
| 7,551,643 | B2 | 6/2009 | Yeo et al. |
| 7,680,058 | B2 | 3/2010 | Seurre et al. |
| 7,912,471 | B2 | 3/2011 | Kodikara Patabandi et al. |
| 7,916,697 | B2 | 3/2011 | Eklund |
| 2001/0044322 | A1 | 11/2001 | Raaf |
| 2002/0024972 | A1 | 2/2002 | Yi et al. |
| 2002/0028690 | A1 | 3/2002 | McKenna et al. |
| 2002/0114294 | A1 | 8/2002 | Toskala et al. |
| 2003/0007512 | A1 | 1/2003 | Tourunen et al. |
| 2003/0050078 | A1 | 3/2003 | Motegi et al. |
| 2003/0123485 | A1 | 7/2003 | Yi et al. |
| 2003/0139170 | A1 | 7/2003 | Heo |
| 2003/0165133 | A1* | 9/2003 | Garani ............... 370/347 |
| 2003/0189922 | A1 | 10/2003 | Howe |
| 2003/0207696 | A1 | 11/2003 | Willenegger et al. |
| 2003/0223452 | A1 | 12/2003 | Toskala et al. |
| 2004/0014452 | A1* | 1/2004 | Lim et al. ............. 455/403 |
| 2004/0028078 | A1 | 2/2004 | Beckmann et al. |
| 2004/0117860 | A1 | 6/2004 | Yi et al. |
| 2004/0121771 | A1 | 6/2004 | Song et al. |
| 2004/0147269 | A1 | 7/2004 | Kim |
| 2004/0180675 | A1 | 9/2004 | Choi et al. |
| 2004/0202107 | A1 | 10/2004 | Bensimon et al. |
| 2004/0233870 | A1 | 11/2004 | Willenegger |
| 2004/0253959 | A1 | 12/2004 | Hwang et al. |
| 2005/0041610 | A1 | 2/2005 | Lee et al. |
| 2005/0041681 | A1 | 2/2005 | Lee et al. |
| 2005/0070253 | A1 | 3/2005 | Farnsworth et al. |
| 2005/0094670 | A1 | 5/2005 | Kim |
| 2005/0141462 | A1 | 6/2005 | Aerrabotu et al. |
| 2005/0176474 | A1 | 8/2005 | Lee et al. |
| 2005/0185620 | A1 | 8/2005 | Lee et al. |
| 2005/0232271 | A1 | 10/2005 | Kettunen et al. |
| 2005/0238051 | A1 | 10/2005 | Yi et al. |
| 2005/0288022 | A1 | 12/2005 | Ryu et al. |
| 2006/0067364 | A1 | 3/2006 | Jung et al. |
| 2006/0087994 | A1 | 4/2006 | Barth et al. |
| 2006/0126554 | A1 | 6/2006 | Motegi et al. |
| 2006/0165045 | A1 | 7/2006 | Kim et al. |
| 2006/0245417 | A1 | 11/2006 | Conner et al. |
| 2007/0060139 | A1 | 3/2007 | Kim et al. |
| 2007/0165567 | A1 | 7/2007 | Tan et al. |
| 2007/0177569 | A1 | 8/2007 | Lundby |
| 2007/0178875 | A1 | 8/2007 | Rao et al. |
| 2007/0206531 | A1* | 9/2007 | Pajukoski et al. ........... 370/329 |
| 2007/0224993 | A1 | 9/2007 | Forsberg |
| 2007/0248075 | A1 | 10/2007 | Liu et al. |
| 2007/0291673 | A1 | 12/2007 | Demirhan et al. |
| 2007/0291719 | A1 | 12/2007 | Demirhan et al. |
| 2007/0291728 | A1 | 12/2007 | Dalsgaard et al. |
| 2007/0291729 | A1 | 12/2007 | Dalsgaard et al. |
| 2008/0056273 | A1 | 3/2008 | Pelletier et al. |
| 2008/0101268 | A1 | 5/2008 | Sammour et al. |
| 2008/0167089 | A1 | 7/2008 | Suzuki et al. |
| 2008/0181127 | A1 | 7/2008 | Terry et al. |
| 2008/0273610 | A1* | 11/2008 | Malladi et al. ............ 375/260 |
| 2010/0046384 | A1 | 2/2010 | Lee et al. |
| 2010/0309877 | A1* | 12/2010 | Damnjanovic et al. ....... 370/329 |

FOREIGN PATENT DOCUMENTS

| | | |
|---|---|---|
| CN | 1835627 | 9/2006 |
| EP | 0 889 664 | 1/1999 |
| EP | 1 148 753 | 10/2001 |
| EP | 1 168 877 | 1/2002 |
| EP | 1 209 938 | 5/2002 |
| EP | 1 304 898 | 4/2003 |
| EP | 1 315 356 | 5/2003 |
| EP | 1 318 632 | 6/2003 |
| EP | 1337124 A2 | 8/2003 |
| EP | 1372310 A1 | 12/2003 |
| EP | 1 420 551 | 5/2004 |
| EP | 1 501 328 | 1/2005 |
| EP | 1 511 245 | 3/2005 |
| EP | 1 720 373 | 11/2006 |
| EP | 1720322 A1 | 11/2006 |
| EP | 1 932 380 A2 | 6/2008 |
| JP | 6-006294 | 1/1994 |
| JP | 2002-539686 | 11/2002 |
| JP | 2003-504935 | 2/2003 |
| JP | 2003-087180 | 3/2003 |
| JP | 2003-235064 | 8/2003 |
| JP | 2004-134904 A | 4/2004 |
| JP | 2005-354488 | 12/2005 |
| JP | 2006-505979 | 2/2006 |
| JP | 2006-067115 | 3/2006 |
| JP | 2009-540721 | 11/2009 |
| JP | 2009-542100 | 11/2009 |
| KR | 10-2001-0015234 | 2/2001 |
| KR | 10-2001-0105240 | 11/2001 |
| KR | 10-2003-0026924 | 4/2003 |
| KR | 10-2004-0039944 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| RU | 2 249 917 | 4/2005 |
| WO | WO 00/11878 | 3/2000 |
| WO | WO 00/74416 | 12/2000 |
| WO | WO 02/39622 | 5/2002 |
| WO | WO 2004/043094 | 5/2004 |
| WO | WO 2004/064272 | 7/2004 |
| WO | WO-2005/048613 A1 | 5/2005 |
| WO | WO 2006/000876 | 1/2006 |
| WO | WO 2006/018670 | 2/2006 |
| WO | WO 2006/049441 A1 | 5/2006 |
| WO | WO 2006/075820 A1 | 7/2006 |
| WO | WO 2006/104344 | 10/2006 |
| WO | WO 2006/109851 | 10/2006 |
| WO | WO 2007/025138 A2 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO 2008/096984 | 8/2008 |
| WO | WO 2008/111684 A1 | 9/2008 |

OTHER PUBLICATIONS

3GPP-RAN WG2, Meeting #56-bis, R2-070107, "Requirements for redirection in E-UTRAN", Nokia, Jan. 2007.
IPWIRELESS: "Layer 2 functions for LTE", 3GPP TSG RAN WG2 #48bis, R2-052377, Oct. 2005.
Samsung Electronics Co., Ltd.: "Selective forwarding/retransmission during HO", 3GPP TSG-RAN2 Meeting #56BIS, R2-070130, Jan. 2007.
Samsung Electronics Co., Ltd.: "Re-use of PDCP SN at ARQ level", 3GPP TSG-RAN2 Meeting #53bis, R2-061829, Jun. 2006.
Panasonic, "MAC PDU format for LTE", 3GPP TSG RAN WG2#56bis, R2-070096, Jan. 2007.
LG Electronics, "Relative Buffer Status Reporting", 3GPP TSG-RAN WG2 meeting #46bis, R2-050852, Apr. 2005.
LG Electronics Inc: "PDCP retransmissions" 3GPP Draft; R2-073041 PDCP Retransmissions_V2, Aug. 16, 2007, XP050135778.
LG Electronics Inc: "Contents of PDCP Status Report R2-07xxxx", 3GPP TSG-RAN WG2, 59, Oct. 8, 2007, pp. 1-3, XP002580785.
"PDCP Structure and Traffic Path" 3GPP Draft; R2-073259, Aug. 16, 2007, XP050135985.
ASUSTEK: "Granularity Consideration for Variable RLC PDUsizes"; R2-070336, XP050133423.
"3GPP; Technical Specification Group Raido Access Network; Medium Access control (MAC) protocol specification (Release 7)"; XP050367709.

BOSCH: "Header Compression Signalling" 3GPP Draft; XP050114120.
3GPP Generation Partnership Project; 3Gpp Standard; 3Gpp TS 25.323, XP050367856.
"Research on the Access Network and MAC Technique for Beyond 3G System" Gao, et al.; IEEE Wireless Communication; Apr. 2007.
XP002460800; Alcatel-Lucent: "Downlink Control Signaling and Multiplexing for VOIP, R1-071721" Jun. 26, 2007, pp. 1-4.
XP002602993; Nokia Corporation, Nokia Siemens Networks: "MAC header format, R2-073891", 3GPP TSG_RAN WG2 meeting 59bis, Oct. 1, 2007.
XP050134474; LG Electronics Inc: "Support for VoIP over MAC-hsEHS" 3GPP Draft; R2-071542, Apr. 2, 2007.
NTT Docomo et al: "MAC PDU structure for LTE", 3GPP TSG RAN WG2 #56bis, R2-070280, Jan. 2007, XP050133369.
Catt et al: "Enhancement to Buffer Status Reporting", 3GPP TSG-RAN WG2 #57bis, R2-071345, Mar. 2007, XP050134291.
LG Electronics: "UL Timing Control related to Contention Resolution", 3GPP TSG-RAN WG2 #61bis, Shenzhen, China, Mar. 31-Apr. 4, 2008, R2-081607, XP050139334.
$3^{rd}$ Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.
NOKIA: "Active mode DRX details", Internet Citation, Oct. 13, 2006, XP002437990, Retrieved from the Internet: URL: http://www.3gpp.org/ftp/tsg_ran/WG2_RL2/TSGR_255/Documents [retrieved on Jun. 15, 2007].
Email Rapporteur (NOKIA): "DRX in E-UTRAN", 3GPP DRAFT; R2-070463 DRX in EUTRAN, $3^{rd}$ Generation Partnership Project (3GPP), Mobile Competence Centre; 650, Route Des Lucioles; F-06921 Sophia-Antipolis Cedex; France, vol. RAN WG2, No. St. Louis, USA; Feb. 9, 2007, XP050133530, [retrieved on Feb. 9, 2007].
NTT Docomo et al: "Views on DRX/DTX control in LTE", 3GPP DRAFT; R2-063397, $3^{rd}$ Generation Partnership Project (3GPP), Mobile Competence Centre; 650, Route Des Lucioles; F-06921 Sophia-Antipolis Cedex; France, vol. RAN WG2, No. Riga, Latvia; Nov. 2, 2006, XP050132870, [retrieved on Nov. 2, 2006].
Ericsson: "Initial Random Access Procedure for E-UTRAN", 3GPP TSG-RAN WG2 #55, Seoul, Korea, Oct. 9-13, 2006, R2-062853.
Samsung: "LTE Random access procedure", 3GPP TSG RAN #54, Tallinn, Estonia, Aug. 28-Sep. 2, 2006, R2-062258.
Siemens: "Initial Access Procedure", 3GPP TSG-RAN WG2 LTE Adhoc meeting, Cannes, France, Jun. 27-30, 2006, R2-061931.
CATT, "Non-synchronized access and C-RNTI allocation", 3GPP WSG-RAN WG2, #55, Seoul, Korea, Oct. 9-13, 2006, R2-062933.
"LTE Handover procedures, text proposal", 3GPP Draft; R2-061338 TP For TR 25813 on LTE Handover-FD, $3^{rd}$ Generation Partnership Project (3GPP), Mobile Competence Centre; 650, Route des Lucioles; F-06921 Sophia-Antipolis Cedex; France, vol. RAN WG2, no. Shanghai, China; May 4, 2006, XP050131278, [retrieved on May 4, 2006] p. 1, lines 7-10, paragraph 2; p. 1, lines 15-16, paragraph 2; p. 1, lines 27-30, paragraph 2; p. 3, lines 6-9.
Samsung: "UL Timing Sync Procedure", Internet Citation, Mar. 27, 2006, R2-0601006, XP002434793, Retrieved from the Internet: URL: http://www.3gpp.org/ftp/tsg_ran/WG2_RL2/TSGR2_52/Documents/ [retrieved on May 23, 2007] p. 1, paragraph 1; p. 3, paragraph 2.3; p. 4, lines 5-6, paragraph 3.
R2-063034, "Open issues in random access procedure" Qualcomm Europe, Oct. 9-13, 2006 Entirety.
Samsung, Contention resolution in aRACH, 3GPP TSG-RAN WG2#57bis R2-071386, Mar. 30, 2007.
TD Tech, Contention Resolution and Initial Random Access, 3GPP TSG-RAN WG2#57 R2-070910, Feb. 19, 2007.
IPWireless, Initial Access Procedure and C-RNTI Allocation, 3GPP TSG-RAN WG2#56bis R2-070301, Jan. 19, 2007.
Ericsson: "Initial, Random Access and Identity Handling", 3GPP Draft; R2-060592, (3GPP), XP050130549, Feb. 9, 2006.
3rd Generation Partnership Project "Radio Interface Protocol Aspects" 3GPP TR 25.813, May 29, 2006.
Ericsson "DRX and DTX in LTE_Active", R2-060967, Mar. 27, 2006.
R2-061986, "Initial access procedure", LG Electronics, Jun. 27 to 30, 2006.

* cited by examiner

METHOD FOR RE-DIRECTION OF UPLINK ACCESS

This application is a national stage entry of International Application No. PCT/KR2007/005386, filed Oct. 30 2007, and claims the benefit of U.S. Application No. 60/863,545, filed Oct. 30, 2006 and Korean Application No. 10-2007-0012576, filed on Feb. 7, 2007, both of which are hereby incorporated by reference in their entireties for all purposes as if fully set forth herein.

TECHNICAL FIELD

The present invention relates to a method for prompt re-direction of an uplink access in a mobile communication network.

BACKGROUND ART

In a mobile communication network, a user equipment in an idle mode uses a random access channel (RACH) to transmit an initial control message to a network. In other words, the user equipment uses the RACH to adjust time synchronization with the network or acquire a radio resource in case of no radio resource in an uplink to which data will be transmitted when the user equipment desires to transmit the data to the uplink.

For example, if the user equipment is powered on and then desires to first access a new cell, the user equipment should transmit an access request message to the uplink for radio resource control connection (RRC connection) after adjusting synchronization of a downlink and receiving system information of a cell which the user equipment desires to access. However, since the user equipment is not adjusted to the current network in time synchronization and does not ensure the radio resource of the uplink, the user equipment requests a base station of a radio resource for transmission of a connection request message to the network through the RACH. The base station which has been requested the radio resource from the user equipment allocates a suitable radio resource to transmit the RRC connection request message to the corresponding user equipment.

For another example, it is assumed that the user equipment is in an RRC connection mode as RRC connection is formed between the user equipment and the network. In this case, the user equipment is allocated with a radio resource depending on radio resource scheduling, and transmits user data to the network through the corresponding radio resource. However, if data to be transmitted does not remain in a buffer of the user equipment, the network does not allocate the radio resource to the corresponding user equipment any more. At this time, the buffer status of the user equipment is reported to the network either periodically or whenever an event occurs. In this case, even though new data occurs in the buffer of the user equipment to which the radio resource is not allocated, since there is no radio resource allocated to the user equipment, the user equipment requests the network to allocate a radio resource required for data transfer, through the RACH.

Hereinafter, an initial access procedure of the user equipment to the network through the aforementioned RACH in a long term evolution (LTE) system will be described, wherein the LTE system has attracted attention as the communication standard for next generation.

FIG. 1 is a signal flow chart illustrating an initial access procedure of the user equipment discussed in the LTE system according to the related art.

The user equipment selects RACH signature and RACH occasion through system information transmitted from the base station, and transmits the selected RACH signature and RACH occasion to the base station through a random access preamble (S101).

After receiving the random access preamble from the user equipment, the base station transmits a random access response to the corresponding preamble to the user equipment (S103). The random access response includes timing offset information (Time Advance: TA) and information of radio resource allocation of the uplink for transmission of the RRC connection request message.

After receiving the random access response, the user equipment transmits the RRC connection request message in accordance with the information of radio resource allocation included in the random access response (S105).

After receiving the RRC connection request message from the user equipment, the base station transmits RRC connection establishment message or RRC contention resolution message to the user equipment depending on circumstances (S107).

In the RRC connection procedure using random access according to the related art, if it is necessary to limit uplink access of the user equipment due to frequent transmission of the RRC connection request message, a wireless network transmits RRC connection rejection message, which includes re-direction information, to allow a specific user equipment to be re-directed to another frequency band or another system. However, since the re-direction information according to the related art is transmitted through the fourth message (S107) of random access, a problem occurs in that the wireless network fails to promptly control uplink access of the specific user equipment.

DISCLOSURE OF THE INVENTION

Accordingly, the present invention is directed to a method for re-direction of uplink access, which substantially obviates one or more problems due to limitations and disadvantages of the related art.

An object of the present invention is to provide a method of promptly controlling uplink access of a specific user equipment, in which a preamble including random access information is transmitted to a base station and its response message which is information required for re-direction access of the user equipment is transmitted to the user equipment.

To achieve these objects and other advantages and in accordance with the purpose of the invention, as embodied and broadly described herein, a method for random access by a terminal in mobile communication system includes transmitting a random access preamble to a network, and receiving from the network a response message corresponding to the random access preamble, wherein if the response message comprises negative control information, the response message comprises additional control information.

In another aspect of the present invention, a method for controlling random access by a network in mobile communication system includes receiving a random access preamble from least one terminal, and transmitting to the at least one terminal a response message corresponding to the random access preamble, wherein if the response message comprises negative control information, the response message comprises additional control information.

BEST MODE FOR CARRYING OUT THE INVENTION

Hereinafter, the preferred embodiment of the present invention will be described with reference to the accompanying drawings, examples of which are based on the background of the present invention.

Figure 1:
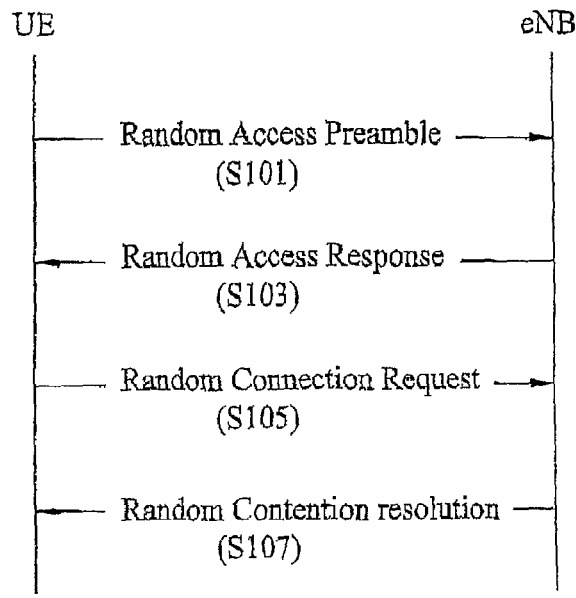
FIG. 1 is a signal flow chart illustrating an initial access procedure of a user equipment discussed in LTE system according to the related art.
Figure 2:
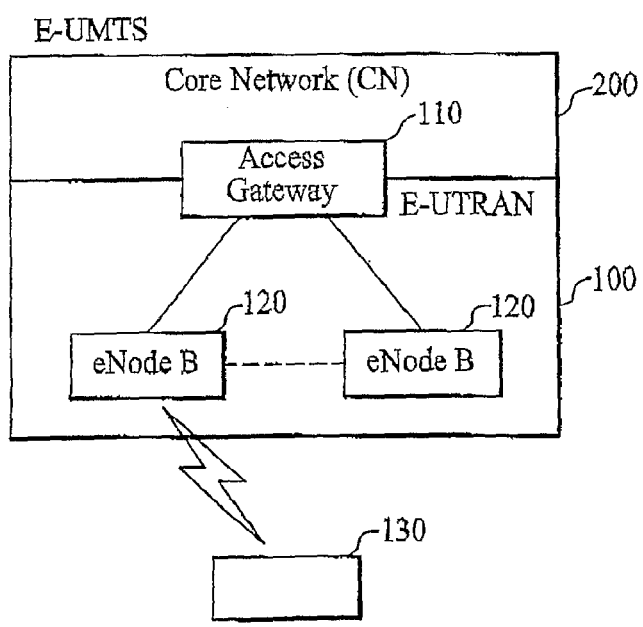
FIG. 2 illustrates a network structure of E-UMTS which is a mobile communication system to which the present invention is applied.

FIG. 2 illustrates a network structure of Evolved Universal Mobile Telecommunications system (E-UMTS) which is a mobile communication system to which the present invention is applied.

The E-UMTS is a system evolving from the conventional UMTS and its basic standardization is currently handled by the 3GPP ($3^{rd}$ Generation Partnership Project). The E-UMTS can also be called an LTE (Long Term Evolution) system.

The E-UMTS can be classified into E-UTRAN 100 and CN 200.

The E-UTRAN 100 includes an access gateway 110 (hereinafter, referred to as 'AG') connected to an external network by being located at an end of the E-UMTS network, a network node 120 (hereinafter, referred to as 'eNode B'), and a user equipment (hereinafter, referred to as 'UE'). The AG 100 may be classified into a part for handling user traffic and a part for handling control traffic. In this case, a new interface may be defined between AG for processing new user traffic and AG for processing control traffic to perform communication between them. One eNode B 120 may include at least one cell. An interface for transmitting user traffic or control traffic may be located between several eNode Bs.

The CN 200 may include the AG and a plurality of nodes for registering users of UE 130. If required, another interface for discriminating between the E-UTRAN 100 and the CN 200 may also be used for the LTE network.

Radio interface protocol layers between the UE 130 and the network can be classified into a first layer L1, a second layer L2, and a third layer L3 based on three lower layers of an open system interconnection (OSI) reference model which is widely known in a communication system. A physical layer corresponding to the first layer provides information transfer service using a physical channel, and a radio resource control (hereinafter, referred to as 'RRC') layer located in the third layer serves to control radio resources between the user equipment and the network. To this end, the RRC layer exchanges RRC messages between the user equipment and the network. The RRC layer may be located by being distributed in respective nodes of the network such as the eNode B 120 and the AG 110. Alternatively, the RRC layer may be located only in the eNode B 120 or the AG 110.

Figure 3:
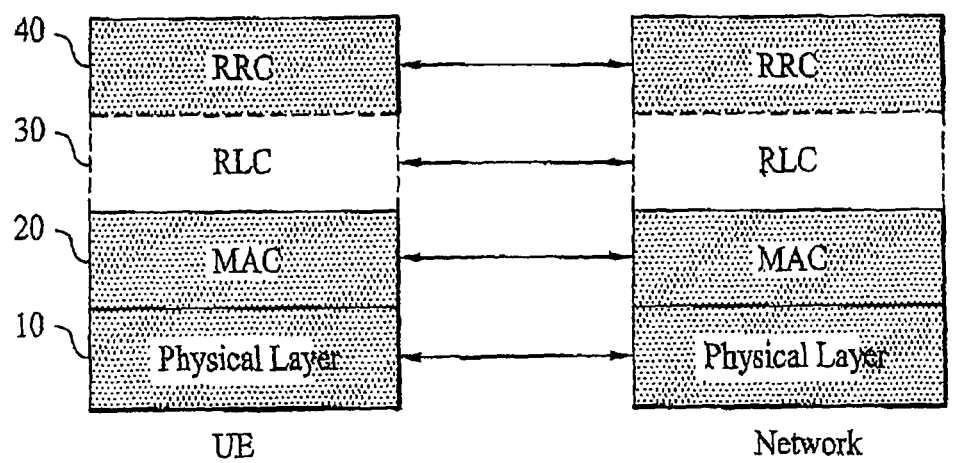
FIG. 3 and FIG. 4 illustrate a structure of a radio interface protocol between a user equipment and UTRAN based on 3GPP radio access network standard.
Figure 4:
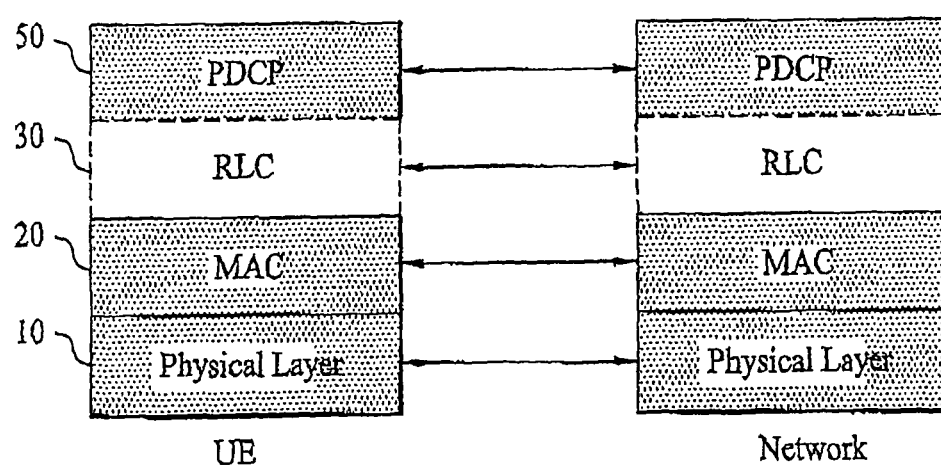

FIG. 3 and FIG. 4 illustrate a structure of a radio interface protocol between the user equipment and UTRAN based on the 3GPP radio access network standard.

The radio interface protocol between the user equipment the UTRAN horizontally includes a physical layer, a data link layer, and a network layer. The radio interface protocol between the user equipment and the UTRAN vertically includes a control plane (FIG. 3) for signaling of a control signal and a user plane (FIG. 4) for transmission of data information. The protocol layers of FIG. 3 and FIG. 4 can be classified into a first layer L1, a second layer L2, and a third layer L3 based on the three lower layers of the OSI reference model which is widely known in the communication system.

The respective layers of a radio protocol control plane shown in FIG. 3 and a radio protocol user plane shown in FIG. 4 will be described in detail.

First of all, the physical layer 10 which is the first layer provides information transfer service to an upper layer using physical channels. The physical layer 10 is connected to a medium access control (hereinafter, referred to as 'MAC') layer 20 above the physical layer 10 via transport channels. Data are transferred between the medium access control layer 20 and the physical layer 10 via the transport channels. Moreover, data is transferred between different physical layers, and more particularly, between one physical layer of a transmitting side and the other physical layer of a receiving side via the physical channels.

The medium access control (hereinafter, referred to as 'MAC') layer 20 of the second layer provides a service to a radio link control layer above the MAC layer via logical channels. A radio link control (RLC) layer 30 of the second layer supports reliable data transfer. Meanwhile, the RLC layer 30 may be realized by functional blocks inside the MAC. In this case, the RLC layer may not exist. In order to effectively transmit IP packets (e.g., IPv4 or IPv6) within a radio-communication period having a narrow bandwidth, a PDCP layer 50 of the second layer performs header compression to reduce the size of a relatively-large IP packet header containing unnecessary control information.

A radio resource control (hereinafter, referred to as 'RRC') layer 40 located on a lowest part of the third layer is defined in the control plane only and is associated with configuration, reconfiguration and release of radio bearers (hereinafter, referred to as 'RBs') to be in charge of controlling the logical, transport and physical channels. In this case, the RB means a service provided by the second layer for the data transfer between the UE and the UTRAN.

As a downlink transport channel carrying data from the network to UEs, there are provided a broadcast channel (BCH) carrying system information and a downlink shared channel (SCH) carrying user traffic or control messages. The traffic or control messages of a downlink multicast or broadcast service can be transmitted via the downlink SCH or an additional downlink multicast channel (MCH). Meanwhile, as an uplink transport channel carrying data from the UEs to the network, there are provided a random access channel (RACH) carrying an initial control message and an uplink shared channel (UL-SCH) carrying user traffic or control message.

Next, a procedure of transmitting the initial control message from UE which is in an idle mode to the network will be described in detail.

In a wideband code division multiple access (WCDMA), the RACH is used to upwardly transmit control message or data of short length. Some of RRC messages, such as RRC connection request message, cell update message, and URA update message, are transmitted through the RACH. Also, among the logical channels, a common control channel (CCCH), a dedicated control channel (DCCH), and a dedicated traffic channel (DTCH) can be mapped with the RACH of the transport channel. The RACH of the transport channel is again mapped with a physical random access channel (PRACH).

If the MAC layer of the UE commands the physical layer of the UE to perform PRACH transmission, the physical layer of the UE selects one access slot and one signature to upwardly transmit a PRACH preamble. The preamble is transmitted for an access slot period of length of 1.33 ms, and one signature among 16 signatures is selected and transmitted for a first certain length of the access slot.

If the UE transmits the preamble, the network node transmits a response signal through an acquisition indicator channel (AICH) which is a downlink physical channel. The AICH transmitted in response to the preamble transmits the signature selected by the preamble for a first certain time period of an access slot corresponding to the access slot to which the preamble is transmitted. At this time, the network node transmits acknowledgement (ACK) or negative-acknowledgement (NACK) through the signature transmitted from the AICH. If the UE receives ACK, the UE transmits a message part of 10 ms or 20 ms by using an orthogonal variable spreading factor (OVSF) code corresponding to the transmitted signature. If the UE receives NACK, the MAC of the UE again commands the physical layer of the UE to perform the PRACH transmission after a proper time period. Meanwhile, if the UE does not receive the AICH corresponding to the transmitted preamble, the UE transmits a new preamble at a power higher than that of the previous preamble by one level after a given access slot.

Hereinafter, the initial random access procedure according to the present invention will be described in detail.

<Embodiment 1>

Figure 5:
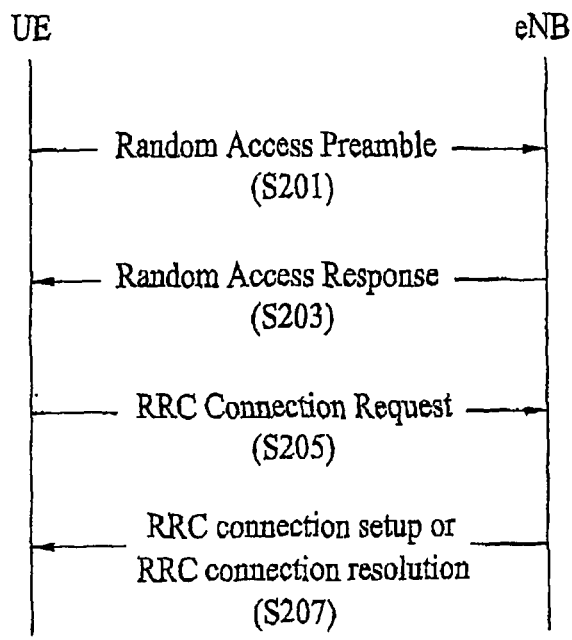
FIG. 5 is a signal flow chart illustrating an initial random access procedure of an idle user equipment according to the present invention.

FIG. 5 is a signal flow chart illustrating an initial random access procedure of an idle user equipment according to the present invention.

First of all, the UE transmits a random access preamble to the network node (S201). At this time, the UE can include uplink message information or channel measurement information in the preamble along with the signature so that the network node can perform resource allocation for uplink transmission.

The network node responds to the preamble as the random access response information (S203). At this time, the response information message includes at least one of the signature transmitted from the UE and grant or rejection information of the signature transmission. The response information message further includes temporary cell radio network temporary identifier (Temporary C-RNTI) allocated to the UE, radio resource allocation information of the RRC connection request message, message size, radio parameters (modulation and coding information and hybrid ARQ information) for RRC connection request message transmission.

Transmission information of the response information message is reported through L1/L2 control channel related to the response information message transmission. The L1/L2 control channel includes RA-RNTI indicating transmission of the response information and transmission parameters related to the corresponding response information message transmission.

Also, the response information message may further include re-direction information, wait time, and reject cause.

After receiving the response information message, if the signature transmitted from the UE is included in the response information message and if there is grant for signature transmission, the UE transmits the RRC connection request message to the network node (S205). At this time, the UE transmits the RRC connection request message by using the radio resource allocation information, the message size, and the radio parameters, which are included in the response information message. The RRC connection request message may include a wideband UE identifier such as international mobile subscriber identity (IMSI) or temporary mobile subscriber identity (TMSI).

If the signature transmitted from the UE is included in the response information message but there is rejection with respect to signature transmission, or if the signature transmitted from the UE is not included in the response information message, the UE retransmits the preamble after a wait time designated in the response information message or a certain time period without transmitting the RRC connection request message.

Selectively, if the response information includes rejection information of the preamble, the UE may retransmit the preamble depending on the wait time previously established in the UE to request the RRC connection regardless of whether the wait time is included in the response information. Alternatively, if the response information includes rejection information of the preamble, the UE may retransmit the preamble by applying different wait time periods depending on the number of signatures or the number of users included in the response information, message size of the response information, or the reject cause, regardless of whether the wait time is included in the response information.

At this time, if re-direction information is included in the response information message, the UE transfers to another system or another frequency band depending on the re-direction information to select a cell again and retry random access.

If the RRC connection request message is received from the network node, the RRC layer of the network node transmits the RRC connection establishment message or the RRC contention resolution message to the UE (S207).

If a plurality of UEs upwardly transmit preambles at the same time by using the radio resource such as the signature, contention occurs between respective transmissions. Accordingly, the network node transmits the RRC contention resolution message to each of the UEs to resolve the contention status. The RRC contention resolution message. includes radio network UE identifier such as C-RNTI, the wideband UE identifier, and re-direction information. The RRC contention resolution message may further include wait time and reject cause.

Therefore, if the RRC contention resolution message includes the wideband UE identifier sent through the RRC connection request message, the UE recognizes that it gets out of the contention. However, if the UE does not receive the RRC connection establishment message for a certain time period, wherein the RRC connection establishment message includes the wideband UE identifier sent through the RRC connection request message, the UE retransmits the preamble after the wait time or a certain time period.

If the RRC contention resolution message does not include the wideband UE identifier sent through the RRC connection request message, the UE recognizes that it fails to get out of the contention, and retransmits the preamble after the wait time or the certain time period.

Preferably, if the RRC contention resolution message does not include the wideband UE identifier sent through the RRC connection request message, the UE retransmits the preamble depending on the wait time established for RRC connection request, regardless of whether wait time is included in the RRC contention resolution message. Alternatively, if the RRC contention resolution message does not include the wideband UE identifier sent through the RRC connection request message, the UE may retransmits the preamble by using different wait time periods depending on the RRC contention resolution message (for example, reject cause), regardless of whether wait time is included in the RRC contention resolution message.

At this time, if the re-direction information is included in the response information message, the UE transfers to another system or another frequency band depending on the re-direction information to select a cell again and retry random access.

In this case, the L1/L2 control channel which indicates the RRC contention resolution message includes the cell radio network temporary identifier (C-RNTI). Accordingly, if the C-RNTI is only included in the L1/L2 control channel, the UE receives the RRC contention resolution message.

<EMBODIMENT 2>

Figure 6:
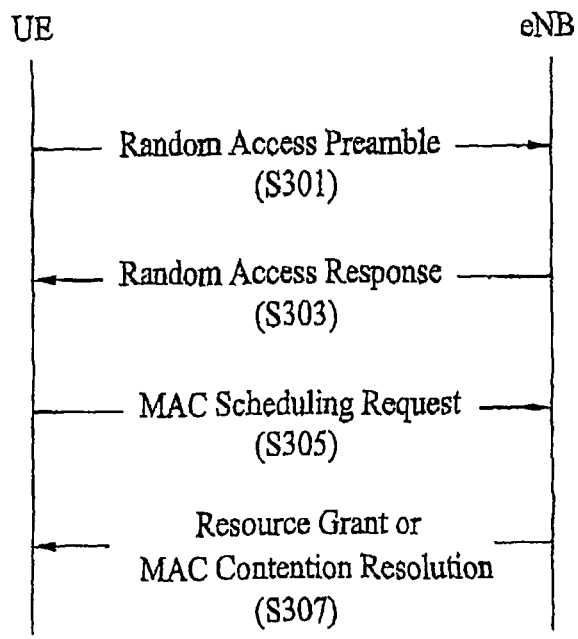
FIG. 6 is a signal flow chart illustrating an initial random access procedure of RCC connection user equipment according to the present invention.

Next, the initial random access procedure of an RRC connection UE will be described in detail. FIG. 6 is a signal flow chart illustrating the initial random access procedure of the RRC connection UE.

First of all, the UE transmits a random access preamble to the network node (S301). At this time, the UE can include uplink message information or channel measurement information in the preamble along with the signature so that the network node can perform resource allocation for uplink transmission.

The network node responds to the preamble as the random access response information (S303). At this time, the response information message includes the signature transmitted from the UE and grant or rejection information of the signature transmission. The response information message further includes temporary cell radio network temporary identifier (Temporary C-RNTI) allocated to the UE, radio resource allocation information of MAC scheduling request message, message size, radio parameters (modulation and coding information and hybrid ARQ information) for MAC scheduling request message transmission. Transmission information of the response information message is reported through L1/L2 control channel related to the response information message transmission. The L1/L2 control channel includes RA-RNTI indicating transmission of the response information and transmission parameters related to the corresponding response information message transmission.

Preferably, the response information message includes re-direction information. The response information message may further include wait time and reject cause.

After receiving the response information message, the UE transmits the MAC scheduling request message (or MAC resource request message) to the network node if the signature transmitted from the UE is included in the information message and if there is grant for signature transmission (S305). At this time, the UE transmits the MAC scheduling request message by using the radio resource allocation information, the message size, and the radio parameters, which are included in the response information message. Preferably, the MAC scheduling request message includes a radio network UE identifier such as C-RNTI.

If the signature transmitted from the UE is included in the response information message but there is rejection with respect to signature transmission, or if the signature transmitted from the UE is not included in the response information message, the UE retransmits the preamble after a wait time designated in the response information message or a certain time period without transmitting the MAC scheduling request message.

Preferably, if the response information includes rejection information of the preamble, the UE may retransmit the preamble depending on the wait time established for MAC scheduling request regardless of whether the wait time is included in the response information. Alternatively, if the response information includes rejection information of the preamble, the UE may retransmit the preamble by using different wait time periods depending on the number of signatures or the number of users included in the response information, message size of the response information, or the reject cause, regardless of whether the wait time is included in the response information.

At this time, if re-direction information is included in the response information message, the UE transfers to another system or another frequency band depending on the re-direction information to select a cell again and retry random access.

If the MAC scheduling request message is received in the network node, the MAC layer of the network node transmits a resource grant message to or MAC contention resolution message to the UE (S307).

If a plurality of UEs upwardly transmit preambles at the same time by using the radio resource such as the signature, contention occurs between respective transmissions. Accordingly, the network node transmits the MAC contention resolution message to each of the UEs to resolve the contention status. The MAC contention resolution message includes radio network UE identifier such as C-RNTI, the radio network temporary UE identifier, the wideband UE identifier, and re-direction information. The MAC contention resolution message may further include wait time and reject cause.

If the MAC contention resolution message includes the radio network UE identifier corresponding to the UE, the UE recognizes that it gets out of the contention. However, if the UE does not receive the resource allocation message, which includes the radio network UE identifier corresponding to the UE, for a certain time period, the UE retransmits the preamble after the wait time or a certain time period.

If the MAC contention resolution message does not include the radio network UE identifier corresponding to the UE, the UE recognizes that it fails to get out of the contention, and retransmits the preamble after the wait time or the certain time period.

Preferably, if the MAC contention resolution message does not include the radio network UE identifier corresponding to the UE, the UE retransmits the preamble depending on the wait time established for RRC connection request, regardless of whether the wait time is included in the MAC contention resolution message. Alternatively, if the MAC contention resolution message does not include the radio network UE identifier corresponding to the UE, the UE may retransmits the preamble by using different wait time periods depending on the MAC contention resolution message (for example, reject cause), regardless of whether the wait time is included in the MAC contention resolution message.

At this time, if the re-direction information is included in the response information message, the UE transfers to another system or another frequency band depending on the re-direction information to select a cell again and retry random access.

In this case, if the MAC contention resolution message is transmitted to MAC control PDU, the L1/L2 control channel which indicates the MAC contention resolution message includes the radio network temporary UE identifier. Accordingly, if the radio network temporary UE identifier is only included in the L1/L2 control channel, the UE receives the MAC contention resolution message.

Meanwhile, a value of 'wait time' included in every message of the present invention could be an actual time or a parameter value for calculating the wait time. If the value of 'wait time' is an actual time, the UE applies wait depending on the value. If the value of 'wait time' is the parameter value for calculating the wait time, the UE calculates the wait time actually applied by using the value of 'wait time' included in the message depending on a designated formula. In this case, preamble retransmission by application of different wait times is identical with preamble retransmission by application of different parameter values.

Figure 7:
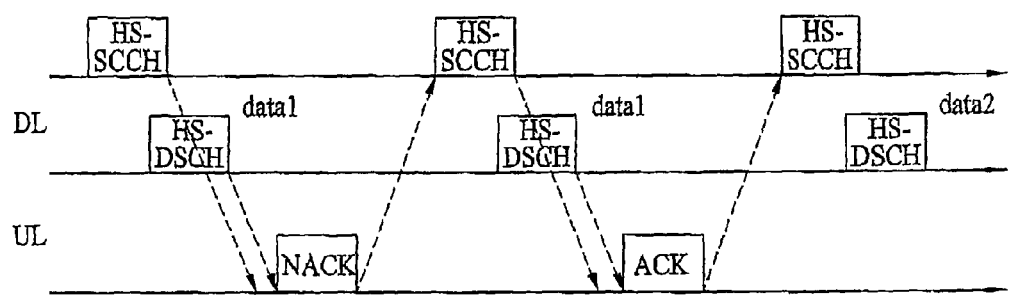
FIG. 7 illustrates an example of HARQ which is applied to a downlink physical layer of a radio packet communication system.

In the step S207 of FIG. 5 and the step S307 of FIG. 6, a hybrid automatic repeat request (HARQ) mechanism of the WCDMA can be used. FIG. 7 illustrates an example of HARQ which is applied to a downlink physical layer of a radio packet communication system.

In FIG. 7, the network node determines a user equipment which will receive a packet and types (coding rate, modulation mode, data capacity, etc.) of the packet which will be transmitted to the user equipment, notifies such information to the corresponding user equipment through high speed downlink shared control channel (HS-SCCH) transmission, and transmits a corresponding data packet through a high speed downlink shared channel (HS-DSCH) at this time. The corresponding user equipment identifies a transmission format of a packet to be transmitted to itself and a transmission timing point by receiving a downlink control channel and receives a corresponding packet. After receiving the packet, the user equipment performs decoding of the packet data. If the user equipment successfully decodes the packet data, the user equipment transmits ACK signal to the network node. The network node which has received the ACK signal senses that packet transmission to the user equipment has been successfully performed and performs the next packet transmission. If the user equipment fails to decode the packet data, the user equipment transmits NACK signal to the network node. The network node which has received the NACK signal senses that packet transmission to the corresponding user equipment has been failed and timely retransmits the same data in the same packet type or a new packet type. At this time, the user equipment combines the retransmission packet with the previous packet whose decoding has been failed in various methods to perform decoding again.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included-in the scope of the invention.

INDUSTRIAL APPLICABILITY

According to the present invention, the random access related information is included in the preamble and then transmitted to the network node, and information required for re-direction access of the user equipment is transmitted to the user equipment in response to the preamble, so as to promptly control uplink access of the specific user equipment, whereby the communication system is desirably operated.

What is claimed is:

1. A method for a random access procedure by a terminal in a mobile communication system, the method comprising:
   transmitting a first random access preamble to a network;
   receiving from the network, in response to the first random access preamble, a random access response message comprising wait time information through a downlink shared channel (DL-SCH),
   wherein a control channel associated with the DL-SCH is used to receive the random access response message through the DL-SCH, and wherein the control channel is different from a broadcast channel,
   wherein a random access response reception is considered not successful after receiving the random access response message; and
   transmitting a second random access preamble to the network after a certain amount of time that is based on the wait time information received through the random access response message.

2. The method according to claim 1, wherein the first random access preamble comprises a signature for distinguishing the terminal from any other terminal.

3. The method according to claim 2, wherein transmitting the second random access preamble is performed if the random access response message does not comprise a signature same to the signature of the first random access preamble, or if the terminal does not receive the random access response message comprising the signature same to the signature of the first random access preamble for a predetermined period.

4. The method to claim 1 wherein the wait time information has a parameter value to be used in calculating the certain amount of time for transmitting the second random access preamble.

5. The method according to claim 1, if at least one of the first random access preamble and the second random access preamble collides with other random access preamble from any other terminal using same signature, same radio resource, and same time as at least one of the first random access preamble and the second random access preamble, the method further comprises:
   receiving a contention resolution message from the network.

6. The method according to claim 5, wherein
   if the contention resolution message comprises a terminal identifier transmitted by the terminal in advance, the terminal establishes an uplink access with the network; and
   if the contention resolution message does not comprise the terminal identifier, the method further comprises retransmitting a third random access preamble.

7. A method for a random access procedure in a mobile communication system, the method comprising:
   receiving a first random access preamble from at least one terminal; and
   transmitting to the at least one terminal, in response to the first random access preamble, a random access response message comprising wait time information through a downlink shared channel (DL-SCH),
   wherein a control channel associated with the DL-SCH is used to transmit the random access response message through the DL-SCH, wherein the control channel is different from a broadcast channel,
   wherein a random access response reception is considered not successful after transmitting the random access response message, and
   wherein the wait time information, transmitted through the random access response message, is used for the at least one terminal to determine a certain amount of time for delaying a transmission of a second random access preamble.

8. The method according to claim 7, wherein the first random access preamble comprises a signature for distinguishing the at least one terminal from any other terminal.

9. The method according to claim 8, wherein the transmission of the second random access preamble is performed by the at least one terminal if the random access response message does not comprise a signature same to the signature of the first random access preamble, or if the at least one terminal does not receive the random access response message comprising the signature same to the signature of the first random access preamble for a predetermined period.

10. The method according to claim 7, wherein the random access response message is transmitted associated with a RA-RNTI (Random Access-Radio Network Temporary Identifier).

11. The method according to claim 10, wherein the RA-RNTI is transmitted through a L1/L2 control channel.

12. The method according to claim 7, wherein the random access response message comprising the wait time information is considered by the at least one terminal such that a reception of the first random access preamble by the network is not successful.

13. The method according to claim 1, wherein the random access response message is identified by a RA-RNTI (Random Access-Radio Network Temporary Identifier).

14. The method according to claim 13, wherein the RA-RNTI is received through a L1/L2 control channel.

15. The method according to claim 1, wherein the random access response message comprising the wait time information is considered by the terminal such that a reception of the first random access preamble by the network is not successful.

* * * * *